July 15, 1958 A. SWANSON 2,842,945
COUPLING

Filed July 18, 1956 4 Sheets-Sheet 1

INVENTOR.
ARTHUR SWANSON
BY Ralph B. Brick
his ATTORNEY

July 15, 1958  A. SWANSON  2,842,945
COUPLING
Filed July 18, 1956  4 Sheets-Sheet 2
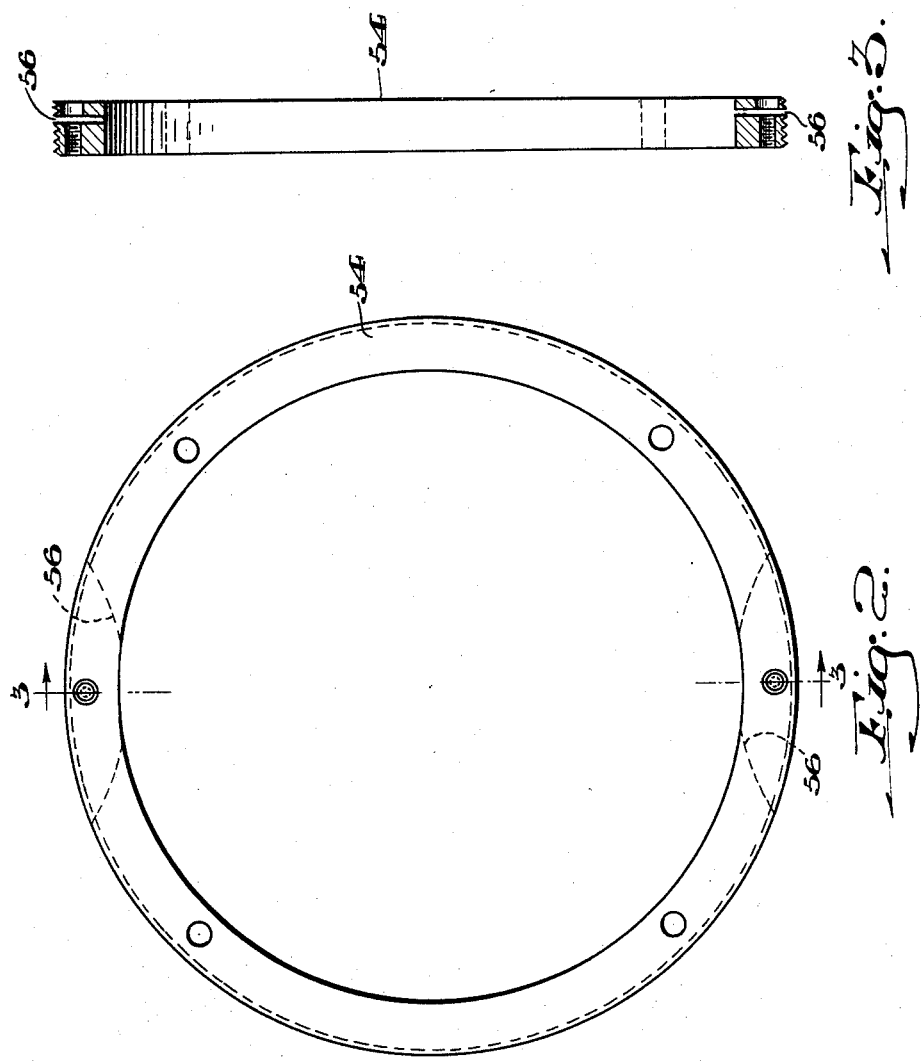
INVENTOR.
ARTHUR SWANSON
BY Ralph B. Brick
his ATTORNEY

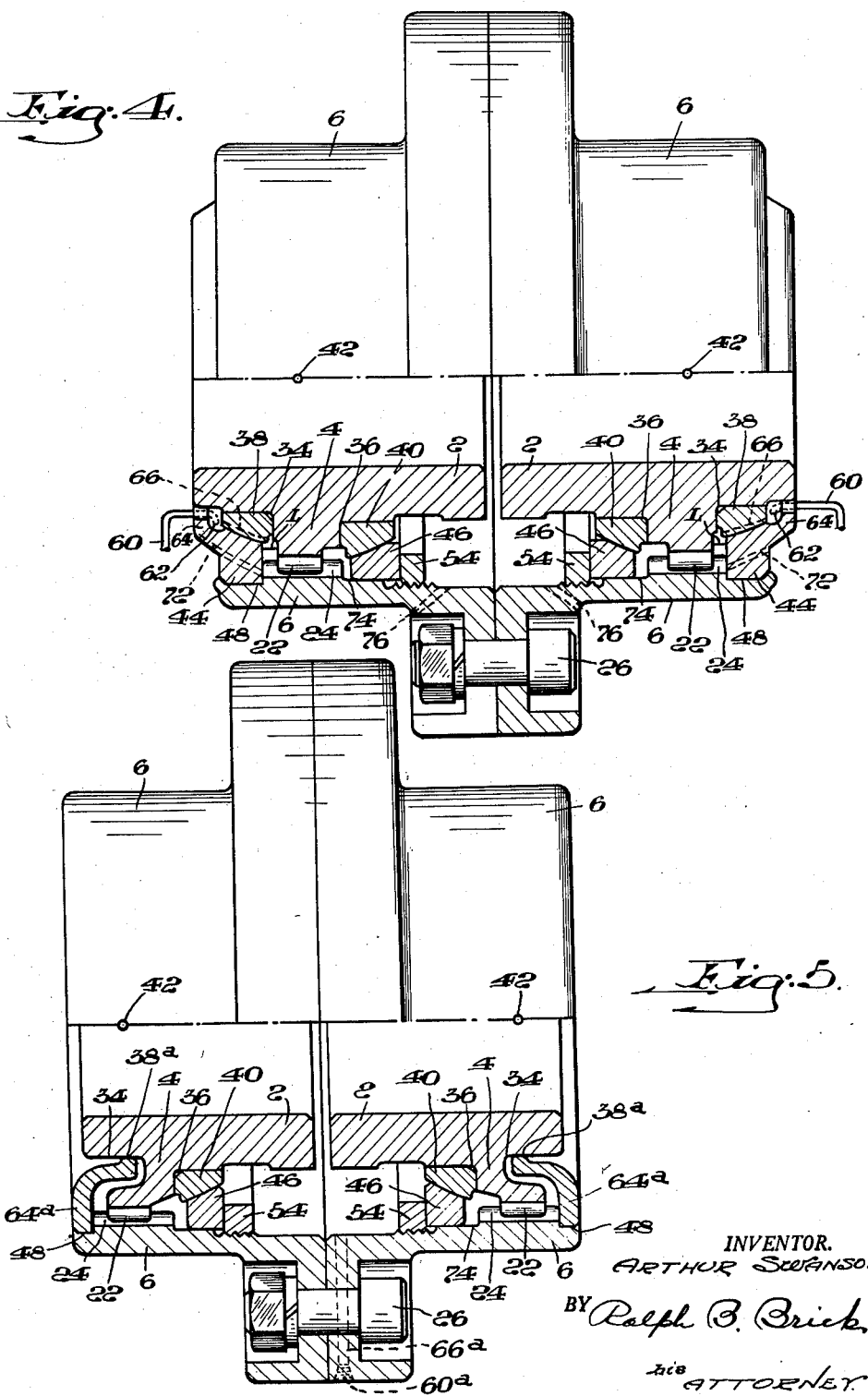

INVENTOR.
ARTHUR SWANSON
BY
Ralph B. Brick.
his ATTORNEY

United States Patent Office 2,842,945
Patented July 15, 1958

2,842,945
COUPLING

Arthur Swanson, Towson, Md., assignor to Koppers Company, Inc., a corporation of Delaware Application July 18, 1956, Serial No. 598,594

10 Claims. (Cl. 64—9)

The present invention relates to flexible couplings, and, more particularly, to thrust bearing flexible couplings providing for both misalignment and axial thrust which permit quick assembly and quick disconnect between driving and driven members.

In the prior art, various type couplings have been used to provide for angular misalignment and also for both offset and angular misalignment between driving and driven members, compensating for acceleratory or vibratory movement in the driven member and providing bearings for transmitting axial thrust in either direction of the driving member. However, these couplings have been comparatively complex and costly in their nature, requiring considerable time and effort to manufacture and assemble, connect and disconnect. Moreover, because of the wear that occurs during ordinary operation, it has been necessary to replace the coupling in its entirety.

The present invention eliminates these aforementioned disadvantages, providing a coupling which is straightforward in its construction and which is efficient in its maintenance and operation.

One of the features of the present invention is to provide a flexible coupling that is more readily and easily constructed and that is efficient to operate and maintain.

Still another feature of the present invention is to provide an axial thrust bearing coupling which is adaptable to angular misalignment, and which also is adaptable for taking offset misalignment as well as angular misalignment, while providing at the same time for rapid connect and disconnect between the coupled members.

Another feature of the present invention is to provide a thrust bearing flexible coupling which requires a minimum replacement of parts in the event of wear through usage.

Still another feature of the present invention is to provide a thrust bearing flexible coupling which has an efficient lubrication system regardless of the position of the coupling.

Various other features of the present invention will become obvious from the disclosure set forth hereinafter.

More particularly, the present invention provides a thrust bearing flexible coupling comprising a female member and male member, the female member having internally disposed teeth and the male member having externally disposed teeth in coaxial relationship to and intermeshing with the teeth of the female member, with or without a peripheral clearance therebetween; a pair of inner and outer axial thrust transmitting rings removably mounted respectively on the male and female members on one side of their intermeshing teeth, the outer ring having an internal concave spherical surface generated by a segment of a circle which has a center of curvature at a point on a line running through the longitudinal axis of the coupling and resting in a plane passing normally through such line and through the midportions of the widths of the teeth, the outer surface of the inner ring being disposed to be in mating line contact with the internal surface of the outer ring, the surface of the inner ring being generated by a segment of a circle of lesser radius than the radius of the generating circle for the surface of the outer ring so as to have a curvature at point of contact smaller than the curvature of the outer ring, and locking means adapted to maintain the male and female members in interrelationship.

It is to be understood that various modifications can be made by one skilled in the art, in the arrangement, form and construction of the apparatus disclosed herein without departing from the scope or spirit of this invention.

Referring to the drawings:

Figure 2 is an enlarged front view of the locking ring in Figure 1;

Figure 3 is a cross-sectional view of the locking ring taken in a plane passing through line 3—3 of Figure 2;

Figure 4 is a vertical central section of a double-directional thrust bearing flexible coupling of the double engagement type, adapted primarily for offset misalignment as well as angular misalignment, in conjunction with the thrust bearing features for axial thrust in two directions;

Figure 5 is a view similar to Figure 4 illustrating a unidirectional thrust bearing flexible coupling of the double engagement type, also adapted primarily for offset misalignment as well as angular misalignment, in conjunction with the thrust bearing features for axial thrust in a single direction;

Figure 1:
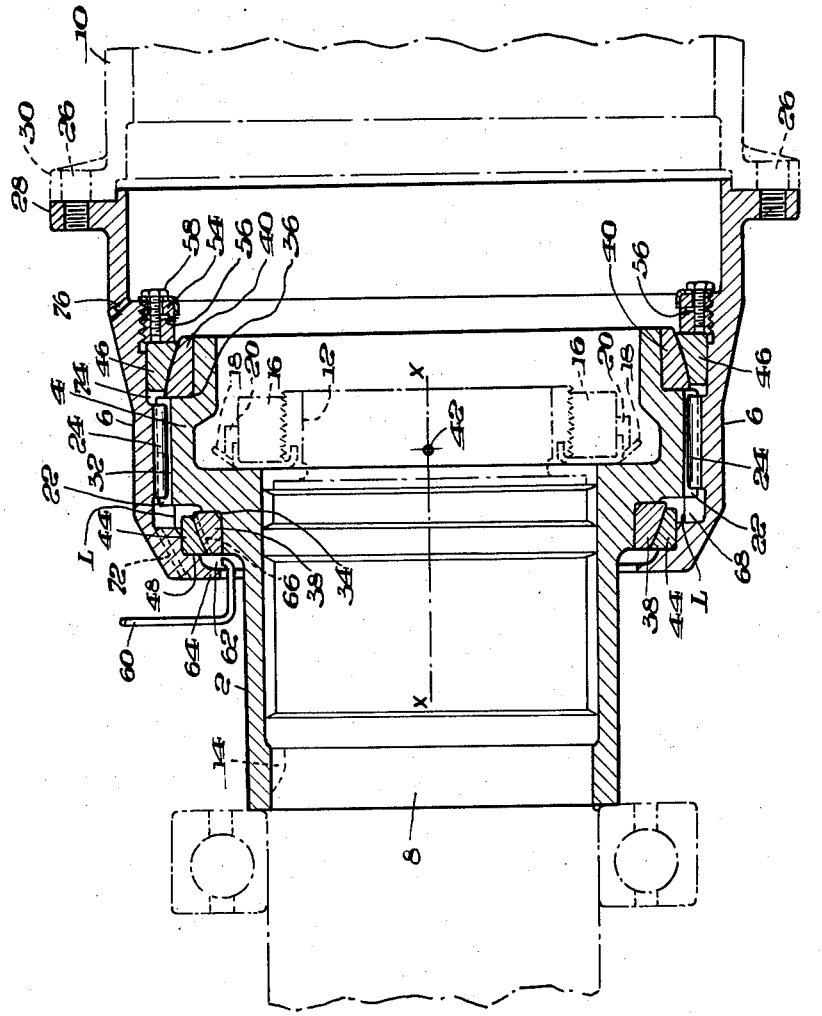
Figure 1 is a vertical central section of a double-directional thrust bearing flexible coupling connecting a driving and driven member and adapted primarily for angular misalignment.

Referring to Figure 1 of the drawings, the coupling comprises a sleeve or male member 2, terminating in a flanged head portion 4 integral therewith. This flanged head portion is adapted to be telescopically interrelated in the chamber of a second sleeve or female member 6, sleeves 2 and 6 being connected respectively to members 8 and 10. One of the two members 8 and 10 serves as the driving member and the other as the driven member.

Sleeve 2 is keyed to the member 8 by means of a spline arrangement 14, the member 8 also having a threaded reduced collar portion 12 at the end. A nut 16 is threaded on collar 12 to maintain sleeve 2 in position on shaft 8, the nut bearing against the flanged head portion 4 of the sleeve 2 and being locked in place by locking member 18 which cooperates with holding element 20 integral with nut 16.

Flange 4 of sleeve 2 is provided along its outer periphery with circumferentially arranged external teeth 22 adapted to engage with circumferentially arranged internal teeth 24 integral with the inner periphery of female sleeve member 6. The member 6 is connected to the member 10 by means of bolts 26 passing through mating bolt holes which are circumferentially spaced along the facing flanges 28 and 30 of the sleeve 6 and member 10, respectively.

The crowns of teeth 22 and 24 can seat one on the other to constitute a radial bearing or the radial bearing also can be by other means such as an end flange 64. In the present invention, though, and as disclosed in Figure 1, the radial bearing is disclosed as advantageously accomplished by means of ring sets 38, 44, and 40, 46. In such an arrangement, the teeth 22, 24 do not seat one on the other, but teeth 22 loosely or freely mesh with teeth 24, the length of teeth 22 exceeding that of teeth 24 and the relative depths of the teeth being such that substantial clearances 32 are provided between the roots and nodes of the meshed teeth. A substantial clearance also can be provided between the flanks or side contact faces of the meshing teeth (not shown) to permit relative movements of the male and female members of the coupling both laterally and angularly.

Figure 6:
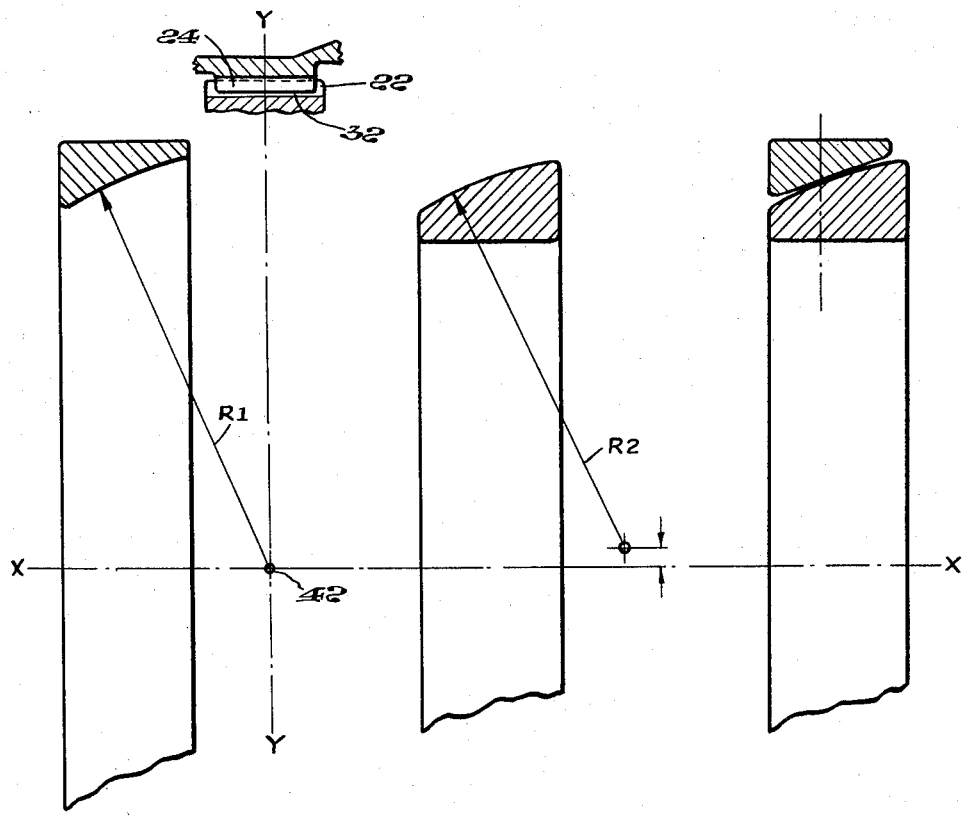
Figure 6 is an enlarged schematic sectional view of a portion of the inner and outer thrust transmitting rings, disclosing in detail the positions of the center of curvature for the outer ring and the difference in radii of the outer and inner ring generating circles to effect the resulting line contact between the two rings.

To mount rings 38, 44 and 40, 46, flange portion 4 of sleeve 2 is provided further with annular recesses 34 and 36 positioned on either side of the external splines 22. Seated in these annular recesses 34 and 36 are the inner thrust rings 38 and 40 respectively. The rings can be made from one or more of any number of various materials and for whatever hardness desired. Referring to Figure 6 of the drawings, it can be seen that each of the inner rings is shaped to have an outer convex surface which is generated by a segment of a circle having a radius $R_2$, the radius $R_2$ being less than radius $R_1$ of the mating outer ring as described hereinafter. Each of the inner rings can be seated in its recess by various means, for example, by press fitting.

As can be seen in Figure 1, convex surfaces of inner rings 38 and 40 are adapted to cooperate slidably with the complementary concave surfaces of outer rings 44 and 46 respectively, which also can be made from one or more of any number of various materials and for whatever hardness desired, ring 44 seating in the annular recess 48 positioned on one side of the internal teeth 24 in sleeve 6 and the ring 46 resting on the inner ring 40 on the other side of teeth 24. Again referring to Figure 6, it can be seen that each of the outer rings has an internal concave spherical surface generated by a segment of a circle which has a center of curvature at a point 42 and a radius $R_1$. The point 42 is on line X—X which runs through the longitudinal axis of the coupling, the point also resting in a plane Y—Y passing normally through such line and through the midportions of the widths of teeth 22, 24. As aforementioned, radius $R_2$ for the inner ring is less than $R_1$ for the outer ring so that the inner ring is disposed to be in mating line contact with the outer ring, the inner ring having a curvature at point of contact smaller than the curvature of the outer ring.

Referring again to Figure 1, sleeve 6 is internally threaded adjacent mating rings 40, 46, to accommodate a threaded locking ring 54. When the locking ring is placed in threaded engagement with sleeve 6, one side of the locking ring abuts against the side of outer ring 46, holding outer ring 46 and inner ring 40 cooperating therewith in proper position. By adjusting locking ring 54, the amount of play between the sets of mating rings 38, 44, and 40, 46 is regulated.

It is to be understood that various types of locking rings can be used and, in an advantageous embodiment of the invention and as can be seen in Figures 2 and 3, locking ring 54 is provided with slots 56 positioned between and substantially parallel to the sides of the ring. By means of bolts 58 which pass normally through these slots, the threaded periphery of the ring can be caused to firmly grip the threaded portion of sleeve 6 with which it engages, thus holding the ring in a selected position.

In order to lubricate the coupling device of Figure 1, a lubricant conduit 60 connected to a source of lubricant (not shown) is provided. The conduit 60 leads into a chamber 62 formed between one side of mating rings 38, 44 and annular lip 64 integral with sleeve 6 and projecting inwardly toward the axis of rotation of the coupling. A plurality of grooves or passages 66 are provided in the inner ring 38, serving as a centrifuging passageway for lubricant from annular chamber 62 into an annular chamber 68 which is formed between the other side of rings 38, 44, the inner periphery of sleeve member 6 and the mating teeth 22, 24. An overflow outlet passage 72 extending through sleeve 6 communicates with the chamber 68. Formed between the other side of mating teeth 22, 24, the inner periphery of sleeve 6 and a side of ring 46 is another annular chamber 74. A lubricant outlet passage 76 extending through sleeve 6 provides an outlet for lubricant that passes between the mating surfaces of rings 40, 46.

In operation, the coupling is arranged to connect the driving and driven members 8 and 10. It is to be noted that either of these two members can be a driving member and the other a driven member, the drive being effected between the intermeshing external teeth 22 of sleeve 2 and internal teeth 24 of sleeve 6.

If angular misalignment occurs between members 8 and 10, the inner rings 38 and 40 are displaced with relation to the outer rings 44 and 46. Since the ring pairs 38, 44 and 40, 46 constitute radial as well as axial thrust bearings between the male and female members 2 and 6, there is a clearance 32 between the nodes and roots of intermeshed teeth 22 and 24 and the depth of teeth 24 exceeds that of teeth 22, the teeth remaining intermeshed during angular movement while said ring pairs transmit axial thrust in two directions.

In order to lubricate the coupling, a lubricant is introduced through the conduit 60 into the annular chamber 62. The lubricant is retained in this chamber by centrifugal force created by the rotation of the two parts in unison. When sufficient lubricant is supplied, the lubricant level in chamber 62 reaches the inlet end of centrifuging passages 66 and lubricant begins to flow along the passages 66, first under centrifugal action and then under static pressure when the lubricant level in chamber 62 has moved toward the axis of rotation of the coupling to a point where the level is closer to the axis of rotation than are the inlets of passages 66. The lubricant enters into chamber 68 and is retained therein also by centrifugal action. The level of the lubricant in chamber 68 moves toward the axis of rotation of the coupling as the lubricant accumulates. When the lubricant in chamber 68 reaches a level L from the axis of rotation, which level L is intermediate the inlet and outlet ends of passages 72, the lubricant passes out of the passage 72 by the combined hydrostatic and centrifugal forces, and is thrown clear of the outer coupling housing by centrifugal action.

With a constant supply of lubricant being fed through conduit 60, a steady lubricant level L will be established in the lubricant chambers, with a constant flow of lubricant passing in through passages 66 between rings 38 and 44 and out through passages 72. In this connection, it is to be noted that because the surfaces of the two rings mate in line contact with each other, as aforedescribed, any movement of the two rings provides a wedging action with the lubricant to maintain a film of lubricant continuously between the rings to support the thrust load.

The lubricant level depends upon the rate at which the lubricant is supplied through the conduit and the flow resistance in the passages. This level will be maintained in event of lubricant supply failure so long as the parts continue to rotate. It is to be noted that the lubricant level L in the chamber 68 will be closer to the axis of rotation during normal operation, than is the surface of ring 40 adjacent annular chamber 74. As a result, the surfaces of rings 40 and 46 also are supplied with lubricant, the lubricant seeping through the rings and being forced by centrifugal action through outlet passages 76. Finally, it is to be noted that with the lubricating system described, lubrication of the coupling will be maintained regardless of any angular misalignment or axial thrust transmitting action that might occur in the coupling.

Although provisions are made to lubricate the slidably cooperating inner and outer ring pairs 38, 40 and 44, 46, respectively, these rings are still subject to wear. For this and other reasons, depending on the particular operation in which the coupling is used, it is advantageous to have a coupling arrangement in which a quick disconnect and reconnect of the coupling can be readily effected. According to the present invention, this is provided by simply removing bolts 26, whereupon nut 16 can be backed off of the reduced collar portion 12 and, in the event of ring wear, a new set of rings quickly substituted. The coupling then can be rapidly reassembled to connect once again the members 8 and 10 without replacing the entire coupling because of such wear.

Referring to Figure 4, the invention is disclosed as incorporated in the form of a conventional double engagement type of flexible coupling for accommodating both offset misalignment as well as angular misalignment, in conjunction with ball bearing type rings, the coupling serving to transmit axial thrust in two directions with two of the male members 2 being interconnected by two of the female members 6 through bolts 26. The male members 2 are constructed in substantially the same manner as the male member 2 in Figure 1, with a central ring of external teeth 22, oppositely disposed recesses 34, 36 for inner rings 38, 40 which have convex external surfaces, lubricant supply 60, lubricant passages 66, and flanged head portion 4.

The two female members 6 each comprise, as in the embodiment of Figure 1, a central ring of internal teeth 24, oppositely disposed recesses 48, 74, for outer rings 44, 46 which have concave spherical internal surfaces for coaction with the convex external surfaces of inner rings 38, 40, lubricant outlets 72 and 76, and adjusting ring 54. In this embodiment, the rings 44 also integrally include the end plates 64 for the coupling.

Referring to Figure 5, the invention is incorporated in the form of a conventional double engagement type of flexible coupling for accommodating both offset misalignment as well as angular misalignment in conjunction with ball bearing type rings for conjointly transmitting axial thrust in a single direction, two of the male members 2 being interconnected by two female members 6 through bolts 26.

The male members 2 each include a central ring of external teeth 22, oppositely disposed recesses 36, 34 for inner ring 40 and for a seat for a ring end plate 64a respectively, and flanged head portion 4. As before, inner ring 40 is provided with a convex external surface.

The two female members 6 each comprise, as in the embodiment of Figure 1, a central ring of internal teeth 24, oppositely disposed recesses 74, 48, for outer ring 46 and for ring end plate 64a respectively, and adjusting ring 54. The inner circumferential perimeter of plate 64a is rounded at 38a and bears radially on the wall of recess 34 that is parallel with the axis of male member 4. In this embodiment, lubrication is by access through passage 66a sealed by removable pipe plug 60a.

The invention claimed is:

1. A flexible thrust coupling comprising a female member and a male member, said female member having internally disposed teeth and said male member having externally disposed teeth in coaxial relationship to and intermeshing with the teeth of said female member for transmitting torque under conditions of misalignment, a pair of inner and outer axial thrust transmitting rings removably mounted, respectively, on the male and female members on one side of their intermeshing teeth, the outer ring having an internal concave spherical surface generated by a segment of a circle having a center of curvature at a point on a line running through the longitudinal axis of the coupling and resting in a plane passing through such line and through the mid-portions of the widths of said teeth, the outer surface of said inner ring being disposed to be in mating line contact with the internal surface of said outer ring, the surface of said inner ring being generated by a segment of a circle of lesser radius than the radius of the generating circle for the surface of said outer ring so as to have a curvature at point of contact smaller than the curvature of said outer ring whereby any movement of the mating rings provides a wedging action of lubricant between said rings to maintain such lubricant as a film continuously therebetween, and locking means for maintaining the female and male members in operative interrelationship.

2. A flexible thrust coupling comprising a female member and male member, said female member having internally disposed teeth and said male member having externally disposed teeth in coaxial relationship to and meshing with the teeth of said female member with a peripheral clearance therebetween; a pair of inner rings removably mounted on said male member on opposite sides of its external teeth, a pair of outer rings removably mounted in said female member on opposite sides of its internal teeth, said outer rings each having concave spherical surfaces generated by a segment of a circle having a center of curvature at a point on a line running through the longitudinal axis of the coupling and resting in a plane passing through such line and through the mid-portions of the widths of said teeth, the outer surface of each of said inner rings being disposed to be in mating line contact with the internal surface of one of said outer rings, the surface of each of said inner rings being generated by a segment of a circle of lesser radius than the radius of the generating circle for the surface of said mating outer ring so as to have a curvature at point of contact smaller than the curvature of said outer ring whereby any movement of the mating rings provides a wedging action of lubricant between said rings to maintain such lubricant as a film continuously therebetween, and locking means adapted to regulate the amount of play between the mating inner and outer rings to maintain said male and female members in predetermined lateral interrelationship.

3. The apparatus of claim 2, wherein said female member is internally threaded to receive said locking means, and said locking means comprises an externally threaded lock ring adapted to engage the internal threads of the female member and to abut against the side of one of said outer rings.

4. The apparatus of claim 3, wherein said lock ring has a slot disposed therein in a position substantially normal to the periphery of said ring and parallel to the sides thereof and a bolt adapted to cooperate with said slot to compress said ring to fix it in a selected position.

5. A flexible coupling comprising a female and male member, said female member having internally disposed teeth and said male member having externally disposed teeth in coaxial relationship to and meshing with the teeth of said female member with a peripheral clearance therebetween; a pair of inner rings removably mounted on said male member on opposite sides of its external teeth, a pair of outer rings removably mounted in said female member on opposite sides of its internal teeth, said outer rings each having concave spherical surfaces generated by a segment of a circle having a center of curvature at a point on a line running through the longitudinal axis of the coupling and resting in a plane passing through such line and through the mid-portions of the widths of said teeth, the outer surface of each of said inner rings being disposed to be in mating line contact with the internal surface of one of said outer rings, the surface of each of said inner rings being generated by a segment of a circle of lesser radius than the radius of the generating circle for the surface of said outer ring so as to have a curvature at point of contact smaller than the curvature of said outer ring whereby any movement of the mating rings provides a wedging action of lubricant between said rings to maintain such lubricant as a film continuously therebetween, the mating inner and outer rings forming ring sets; adjustable locking means adapted to regulate the amount of play between the mating inner and outer rings and to maintain said male and female members in lateral interrelationship; and a lubricating system disposed between said interrelated male and female members adapted to lubricate said coupling through centrifugal force created by rotation of said coupling.

6. The apparatus of claim 5, said lubricating system comprising a lubricant feed line communicating with a first annular chamber radially spaced from the axis of rotation of said coupling and positioned between the extremity of said female member and one side of a set of said mating rings positioned on one side of said intermeshing teeth; a second annular chamber spaced at a greater radial distance from said axis of rotation than said first annular chamber and positioned between the other side of said set of mating rings and said one side of said intermeshing teeth; an inlet pasage communicably connecting said first annular chamber and said second annular chamber; and an outlet passage communicating with said second annular chamber for outlet of lubricant from said second chamber.

7. The apparatus of claim 6, and a third annular chamber positioned on the opposite side of said intermeshing teeth between said teeth and a side of the outer ring of a second set of said mating inner and outer rings, the outlet of said outlet passage, which communicates with said second annular chamber, being spaced a lesser radial distance from the axis of rotation of said coupling than the point adjacent said third annular chamber where the outer ring of said second ring set faces the inner ring of said second set.

8. The apparatus of claim 7, and a third outlet passage positioned in the wall of said female member on the other side of the outer ring of said second set of mating rings whereby lubricant passing between the mating surfaces of said second set of mating rings is forced through said third passage and clear of said coupling by centrifugal action.

9. A flexible thrust coupling comprising, two male members and two female members interconnecting the two male members, each male member comprising a central ring of external teeth and oppositely disposed recesses on opposite sides of the ring of teeth, inner rings in said recesses with convex external surfaces, each female member comprising a central ring of internal teeth with oppositely disposed recesses on opposite sides of the ring of teeth, outer rings in said recesses with concave spherical internal surfaces for coaction with the convex external surfaces of the inner ring of the corresponding male member when the teeth thereof mesh with the teeth of the respective female members, locking means for the coacting inner and outer rings of the male and female members, and means for lubricating the coacting relatively movable parts.

10. A flexible thrust coupling comprising, two male members and two female members interconnecting the two male members, each male member comprising a central ring of external teeth and oppositely disposed recesses on opposite sides of the ring of teeth, an inner ring in one of the recesses with a convex external surface on the inner ring, and a radial bearing external seat in the other recess for bearing engagement with a ring end plate, each female member comprising a central ring of internal teeth with oppositely disposed recesses on opposite sides of the ring of teeth, an outer ring in one of the recesses with a concave spherical internal surface for coaction with the convex external surface of the inner ring of the corresponding male member and a ring end plate in the other recess of each female member with an internal circumferential radial bearing for seating on the radial bearing seal in the other recess of the corresponding male member when the teeth thereof mesh with the teeth of the respective female members, and locking means for the coacting inner and outer rings of the male and female members.

References Cited in the file of this patent

UNITED STATES PATENTS

| | | |
|---|---|---|
| 1,535,621 | Morgan | Apr. 28, 1925 |
| 1,616,034 | Fast | Feb. 1, 1927 |
| 1,770,744 | Morgan | July 15, 1930 |
| 2,565,770 | Johnson | Aug. 28, 1951 |
| 2,565,776 | Monroe | Aug. 28, 1951 |
| 2,726,523 | Zrodowski | Dec. 13, 1955 |